June 4, 1929. P. H. WALLER Re. 17,318

WASHING MACHINE

Original Filed Aug. 23, 1921 3 Sheets-Sheet 1

INVENTOR.
PHILIP H. WALLER

BY Parker & Burton,
ATTORNEY.

June 4, 1929. P. H. WALLER Re. 17,318

WASHING MACHINE

Original Filed Aug. 23, 1921 3 Sheets-Sheet 2

INVENTOR.
PHILIP H. WALLER

BY

Parker & Burton
ATTORNEY.

June 4, 1929. P. H. WALLER Re. 17,318

WASHING MACHINE

Original Filed Aug. 23, 1921 3 Sheets-Sheet 3

INVENTOR.
PHILIP H. WALLER

BY

Parker & Burton,
ATTORNEY.

Reissued June 4, 1929. Re. 17,318

UNITED STATES PATENT OFFICE.

PHILIP H. WALLER, OF STERLING, COLORADO, ASSIGNOR, BY MESNE ASSIGNMENTS, TO RELIANCE STORAGE AND WAREHOUSE COMPANY, OF DETROIT, MICHIGAN, A CORPORATION OF MICHIGAN.

WASHING MACHINE.

Original No. 1,480,646, dated January 15, 1924, Serial No. 494,480, filed August 23, 1921. Application for reissue filed February 24, 1925. Serial No. 11,380.

This invention relates to a washing machine which is more particularly designed for washing clothes, fabric or similar articles, and has for is objects the provision of a machine for this purpose which enables clothes and the like to be not only effectively washed, but also wrung or separated from the bulk of the washing liquid in the same machine and by means which are simple and compact in construction, easily operable and not liable to get out of order.

An important object is the provision in a washing machine of a rotatable tub to contain cleaning fluid and articles to be cleaned which tub is adapted to be slowly rotatably oscillated or rapidly continuously rotated and is provided with a limited number of discharge apertures for cleaning fluid positioned in the upper portion of its side wall only, whereby washing fluid will be discharged from the tub during the rapid continuous rotation to dry the clothes but will not be discharged during the slow oscillatory rotation of the tub.

In the accompanying drawings.

Similar characters of reference refer to like parts throughout the several views.

Figure 1:
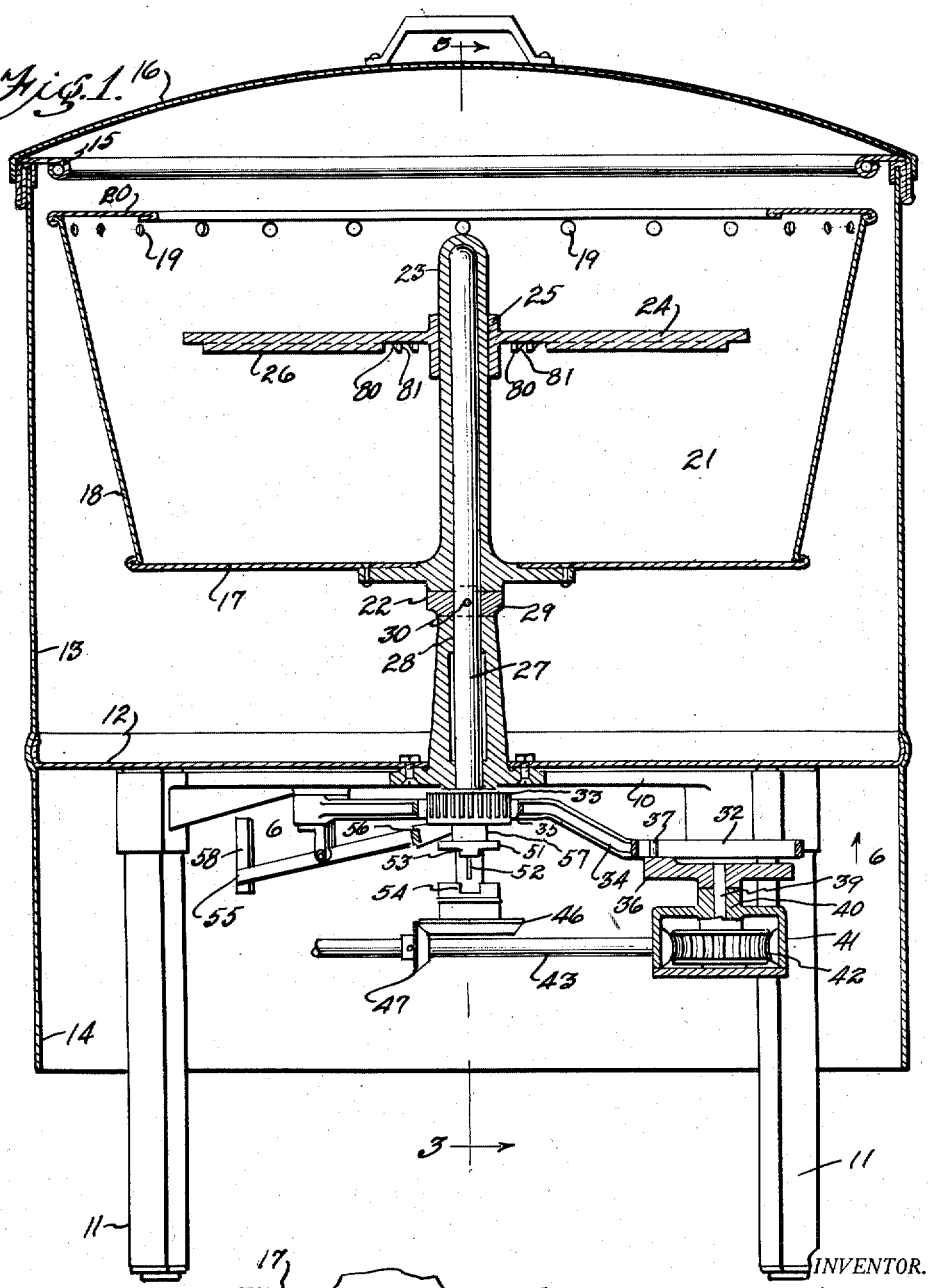
Fig. 1 is a vertical section of a washing machine embodying my invention, the section being taken lengthwise of the main driving shaft.

Although the main frame of this machine may be of any suitable construction, that shown in the drawings comprises a base 10 of skeleton form of a suitable shape to support the working parts of the machine and provided at its periphery with a plurality of downwardly projecting legs 11 which rest upon the floor or ground.

Supported on this frame is a tank which is adapted to enclose a washing tub and to receive the washing liquid from the latter after the washing of the articles in the tub has been completed. This tank comprises a horizontal bottom 12 which is secured to the upper side of the base 10, an upright cylindrical wall 13 rising from this bottom and preferably provided with a depending skirt 14 which encloses the working parts of the machine which are mounted on the main frame below the tank, an annular flange 15 removably secured to the upper edge of the tank wall so as to project inwardly therefrom and a cover 16 detachably secured to the upper end of the tank wall and forming a closure for the top of the tank. By employing the flange 15 the water for washing the clothes which is discharged laterally from the wash tub during the operation of draining the clothes, is prevented from getting over the upper edge of the tank and is compelled to go downwardly and accumulate in the lower part thereof.

The wash tub which is arranged within the tank preferably comprises a horizontal bottom 17, an annular side wall 18 of conical form which flares upwardly from the margin of the bottom 17 and is provided adjacent to its upper edge in an annular row of drain openings 19, and an annular flange 20 projecting inwardly from the wall of the tub above said drain opening. Means are provided for imparting either a slow oscillating or rocking motion to the wash tub or a very rapid continuous rotary motion in the same direction, said oscillating motion being utilized for agitating a batch of clothes 21 or other articles in the tub, so as to cleanse the same in the body of the washing liquid in which the same are immersed, while the rapid continuously rotating motion is utilized for draining the water from the clothes after the same have been washed and discharging this washing liquid into the surrounding tank.

Figure 3:
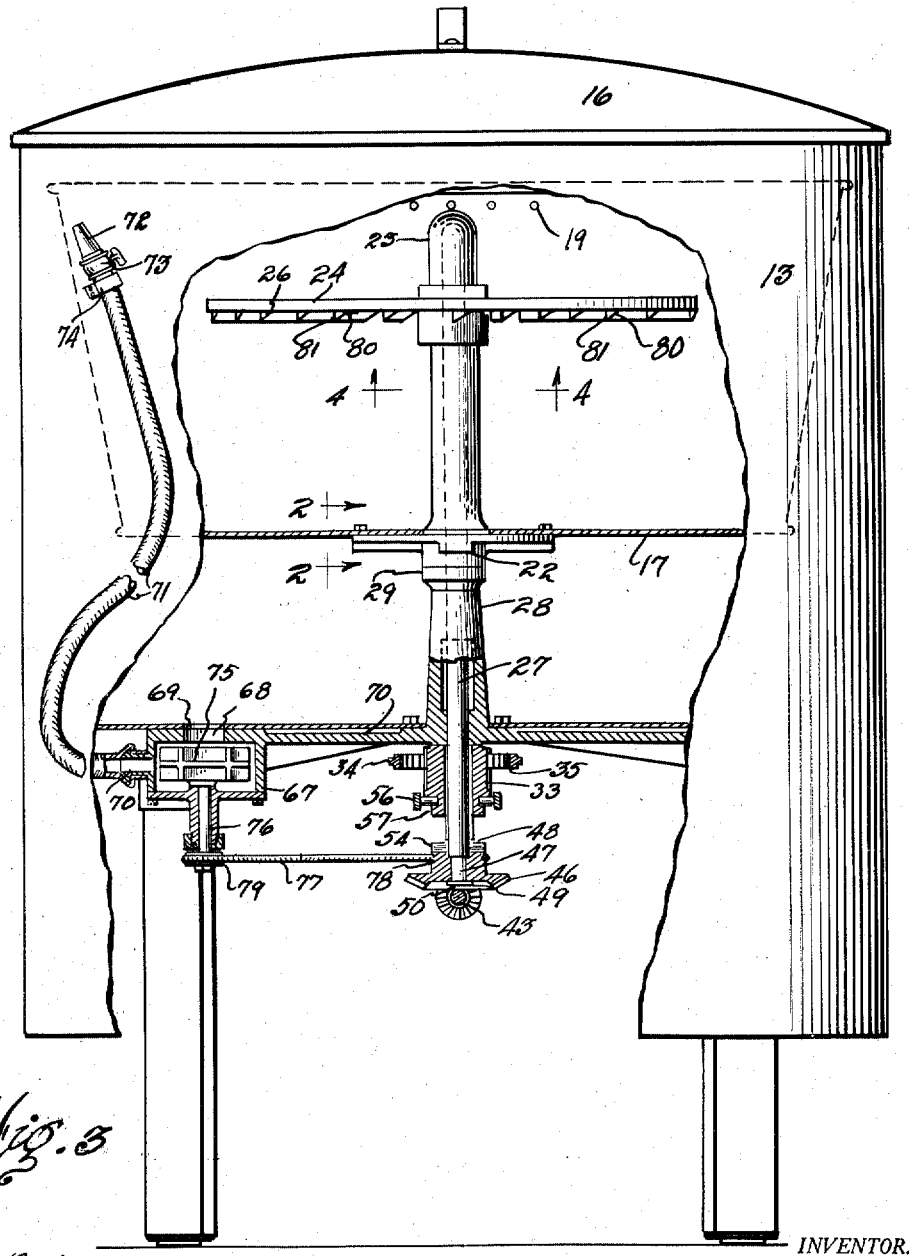
Fig. 3 is a view similar to Fig. 1 but taken at right angles thereto and showing a pump whereby the washing liquid is removed from the tank.
Figure 4:
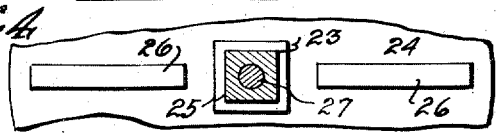
Fig. 4 is a fragmentary horizontal section, taken on line 4—4, Fig. 3 looking upwardly.

While the clothes are arranged in the tub, means are provided for holding the same in a compact mass in the lower part of the tub and also exerting a rubbing action on the same while an oscillating motion is imparted to the tub and the clothes. These means preferably comprise a hub 22 secured centrally to the bottom of the tub and provided with an upwardly projecting post 23 which is preferably square in cross section, and a rubbing disk or board 24 having its hub provided with a square opening 25 which receives the post 23 and is provided, on its underside with a plurality of agitating or rubbing ribs 26, each of which latter preferably has an inclined face 80 on one of its sides and an abrupt face 81 on its opposite side, as shown in Fig. 3.

By means of this construction the rubbing disk plate is free to slide vertically on the post and adapt itself to the top of the batch of clothes in the tub, but is compelled to turn with the post and tub so that the ribs on the underside of the rubbing disk exert a rubbing action on the clothes. By constructing the ribs 26 in the form described they do not only operate to rub the clothes, but also to shift the mass of clothes step by step circumferentially in the tub, inasmuch as the inclined sides of these ribs slide over the top of the clothes while the abrupt sides of the same operate to push the clothes, thereby serving to turn the clothes over progressively and bring all parts of the same under the rubbing action of the rubbing board and its ribs.

The tub is removably mounted upon an upright driven shaft 27 which has its central part journaled in a bearing 28 projecting from the base of the main frame upwardly into the lower part of the tank so that the lower end of the shaft is below the base and the upper end of the same is arranged within the tank. The downward movement of this shaft on its bearings is limited by means of a collar 29 secured thereto by means of a pin 30 and resting on the upper end of the bearing 28.

The post 23 is hollow and receives the upper end of the driven shaft 27 and the downward movement of the tub may be limited by engagement of its hub 22 with the collar 29 and by engagement of the upper end of the hollow post 23 with the upper end of this shaft, as shown in Fig. 1.

Means are provided for permitting the tub to be moved longitudinally on the driven shaft for assembling and dismembering these parts but compelling the same to turn together when the parts are assembled and ready for washing a batch of clothes.

Figure 2:
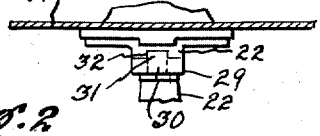
Fig. 2 is a fragmentary vertical section taken on line 2—2, Fig. 3.

The preferred means for this purpose as shown in Figs. 1, 2 and 3, consist of a pair of coupling lugs 31 arranged on the upper side of the collar 29 on diametrically opposite sides thereof and engaging with recesses 32 in the underside of the hub 22 in the tub. By means of these co-operating surfaces, the collar 29 and the hub 22, the tub may be interlocked with the shaft so as to turn therewith when the tub is in its lowermost position and the latter may be conveniently lifted off from the shaft when required.

Figure 5:
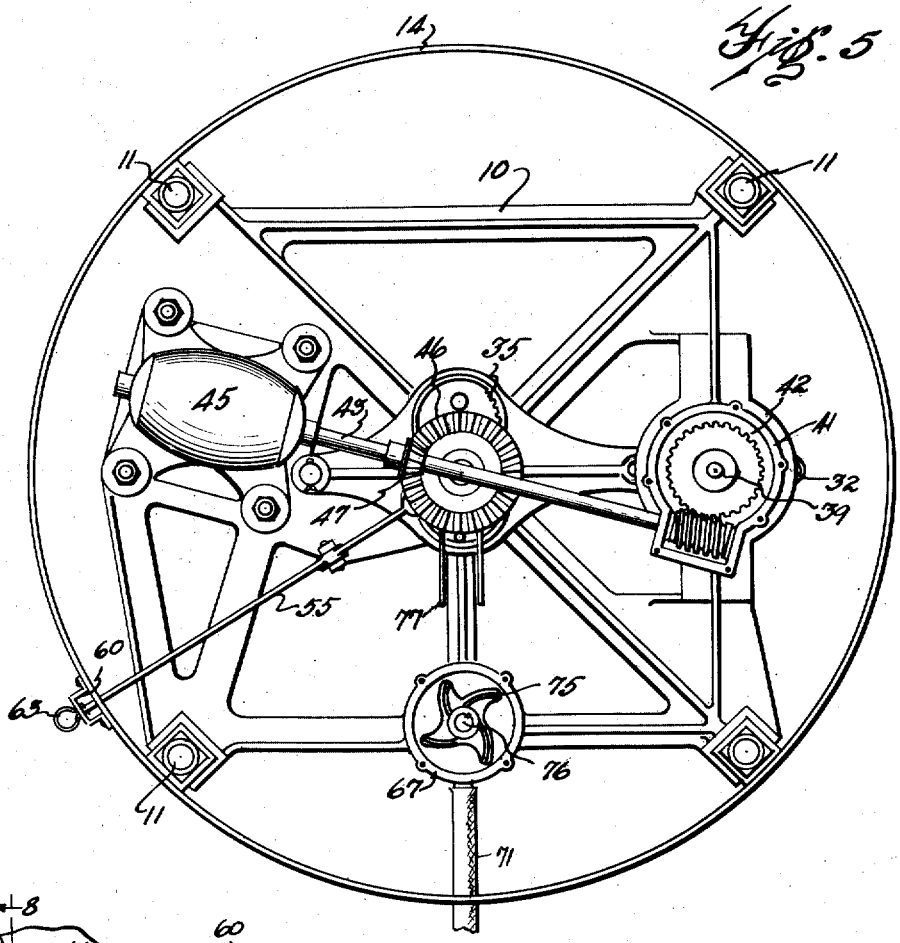
Fig. 5 is a bottom plan view of the machine showing the bottom parts of the pump casing and the worm gear casing removed.
Figure 8:
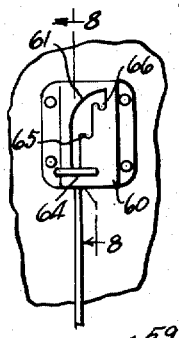
Fig. 8 is a vertical section taken on the correspondingly numbered line in Fig. 7.
Figure 8:
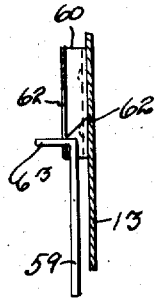
Figure 6:
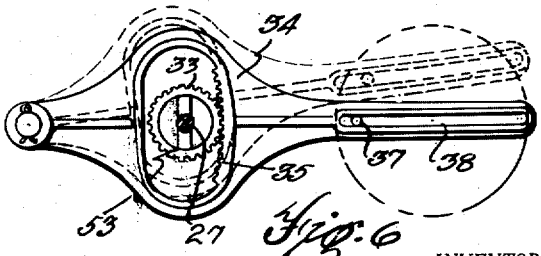
Fig. 6 is a fragmentary horizontal section taken on line 6—6, Fig. 1, looking upwardly.

The means for imparting a rocking or oscillating motion to the tub for washing a batch of clothes are preferably constructed as follows:

33 represents a driven spur gear wheel mounted on the driven shaft below the base 10 and 34 is a horizontally swinging rock lever pivoted at one end on the underside of the base 10 and provided with a gear segment 35 which meshes with the spur gear wheel 33 so that upon rocking this lever an oscillating motion will be imparted to the tub and the parts associated therewith. This oscillating motion may be obtained in any suitable way, but preferably by means of a rotary crank arm 36 provided with a wrist pin 37 which moves in a longitudinal slot or guide way 38 formed in the outer or free end of the rock lever. The crank arm is secured to the upper end of an intermediate shaft 39 which is journaled in a bearing 40 formed on the upper side of the worm gear casing 41, the lower end of said intermediate shaft being provided within this gear casing with a worm wheel 42. 43 represents a horizontal driving shaft which is journaled in suitable bearings on the main frame and provided at one end with a worm 44 which meshes with the worm wheel 42 while power is adapted to be applied to the opposite end of the shaft by any suitable means, for instance, by means of an electric motor 45 or other prime mover mounted on the underside of the base plate and connected with the driving shaft, as shown in Fig. 5. By means of this gearing a comparatively slow oscillating or rocking motion is imparted to the tub, which causes the clothes or other articles therein to be effectively rubbed or scoured and cleansed. The wash water, by reason of being alternately moved in opposite directions at short intervals and at slow speed, will not rise to the top of the tub and escape through the drain openings 19 thereof.

After a batch of clothes or other articles have been subjected to the rubbing or washing action of the tub and associated parts for a sufficient length of time, the slow speed mechanism whereby a slow rocking motion is transmitted from the main driving shaft to the upright driven shaft is rendered inoperative and instead means are rendered operative which cause motion at a relatively high speed to be transmitted from the main driving shaft to the tub shaft so as to rotate or whirl the tub rapidly and continuously in the same direction a sufficient length of time to effect draining of the excess water from the clothes in the tub. The means whereby this is accomplished are preferably constructed as follows:

46 represents a driven beveled gear wheel which is mounted on the lower end of the driven shaft 27 and adapted to be either coupled with or uncoupled from said shaft and meshing constantly with a driving beveled gear wheel 47 secured to the driving shaft 43. The driven bevel gear wheel 46 at times turns loosely on the lower end of the driven shaft 27 and is confined against longitudinal movement on this shaft by means of a downwardly facing shoulder 48 on this shaft engaging with the upper end of the hub of this beveled wheel and the washer 49 bearing against the lower end of this hub and retained on the shaft by means of a pin 50, as shown in Fig. 3.

The hub 51 of the spur gear wheel 33 is connected with the shaft by means of a spline 52 so that this gear wheel and this hub are capable of sliding lengthwise on the shaft, but are compelled to turn therewith. The lower end of the hub 51 is adapted to be coupled with the hub of the gear wheel 46 by means of a pair of coupling lugs 53 arranged on the hub 51 and adapted to engage the coupling recesses 54 in the upper end on the hub of the gear wheel 46. In the position of the parts shown in Figs. 1 and 3, the spur gear wheel 33 is in its uppermost position and engages with the gear segment 35, whereby an oscillating motion for washing purposes is transmitted from the driving shaft 43 to the tub. Upon moving the gear wheel 33 downwardly out of engagement from the gear segment 35 and into its lowermost position the coupling lugs 53 of the spur gear wheel 33 will engage the notches 54 of the driven bevel wheel 46 so that now a rapid motion will be transmitted from the main driving shaft 43 to the tub for turning the latter at high speed continuously in the same direction. When this occurs the water in the clothes or other articles is drained by centrifugal force out of the same and caused to move upwardly along the inner side of the tub wall and finally escapes through the drain openings 19 into the water tank which surrounds the tub, this rapid rotary movement of the tub being continued a sufficient length of time to thoroughly remove from the clothes all of the excess water so that the clothes when removed from the tub are ready to be completely dried in the usual manner by hanging the same out on a line, placing the same in a clothes drier or otherwise.

When the spur gear wheel 33 occupies an intermediate position between the gear segment 35 and driven bevel gear 46, then the driving mechanism is neutral and no motion is transmitted from the driving shaft to the tub, at which time clothes may be either introduced into the tub or removed therefrom as well as any other functions which require the tub to remain at rest.

Figure 7:
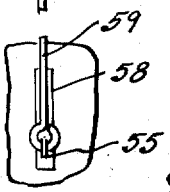
Fig. 7 is a fragmentary side elevation showing the means for holding in position the lever which controls part of the gearing for operating the washing tub.

For the purpose of conveniently shifting the spur gear pinion either into its neutral central or into its upper or lower positions, for either rocking the tub slowly or rotating the same at high speed, means are provided which are preferably constructed as follows:

55 is a vertically swinging rock lever which is pivoted on the underside of the base 10 and provided on its inner arm with a fork 56 which engages with an annular groove 57 on the hub 51 of the spur gear wheel, while the outer arm of this lever projects through a vertical slot 58 in the skirt 14, as shown in Figs. 1, 5 and 7.

59 represents an upright shipper rod arranged outside of the skirt and wall of the tank and connected at its lower end with the outer end of the shifting lever 55. The upper part of this shipper rod passes through the upright guide loop 60 of a bracket, which is secured to the outer side of the tank wall 13 and provided with an upright slot 61 which receives an adjusting or retaining shank 62 connecting the upper part of the shipper rod 59 to the handle 63. This slot 61 is constructed to form a vertical series of shoulders 64, 65 and 66, which are arranged progressively at different heights and adapted to receive the adjusting shank 62 for the purpose of holding the spur gear wheel 33 in different positions. Three of such shoulders are employed as shown in Fig. 7, the lowest one 64 corresponding to the position of the spur gear wheel when in its uppermost position and engaging with the segmental gear 35, the intermediate shoulder 65 corresponding to the position of this spur gear wheel when the same is neutral and out of engagement from the driven beveled gear wheel 46 and the segmental gear 35, and the highest shoulder 66 corresponding to the position of the spur gear wheel 33 while the same is in its lowest position and engaging with the driven bevel gear wheel 46. By this means the driving mechanism of the tub can be regulated and conveniently operated so as to either stop the rotation of the tub or cause the same to be oscillated slowly for washing a batch of clothes or to be rotated rapidly in one direction for draining the water from the clothes.

After the water has been discharged from the tub to the tank, the water may be removed from the latter and conducted to a waste if the same is not clean or no longer required, or this water when sufficiently clean, may be again returned to the tub for use in washing another batch of clothes. The mechanism for accomplishing this purpose is constructed as follows:

67 represents the casing of a rotary pump which has an inlet 68 in its upper side which communicates with an outlet 69 in the bottom of the tank. On one part of its periphery this pump casing is provided with an outlet 70 to which one end of a flexible tube 71 is connected, the opposite end of this tube being provided with a nozzle 72 and a valve 73 whereby the discharge of water from this tube may be controlled. When this tube is not in use the same may be supported at its free end on a clip 74 secured to the outer side of the tank, as shown in Fig. 3. Within the pump casing is a rotary impeller 75 which is secured to the upper end of an impeller shaft 76 journaled in a bearing on the lower side of the pump casing. This shaft is turned by means of a belt 77 passing around a driving pulley 78 formed on the hub of the driven bevel gear wheel 46 and also around a driven pulley 79 secured to the lower end of the impeller shaft, as best shown in Fig. 3. By means of this driving mechanism for the pump, the impeller will not only be operated whenever the driving shaft is turned, at which time the water may be removed from the tank by means of the pump to any suitable place upon opening the valve 73 of the delivery tube 71. If desired, the water may be discharged from the tank while the clothes are being drained, or the valve 73 may be retained in its closed position, at which time the impeller 75 of the pump will simply rotate idly within its casing without accomplishing any purpose or doing any harm.

If it is desired to return the water from the tank to the tub for using the same over again on another batch of clothes, the water may be delivered by the hose 71 to the tub while the driven spur gear 33 is in its central position and the tub is not turning at this time.

As a whole, this washing machine is very simple and compact in construction considering the various functions which it performs, it has no delicate parts which are liable to get out of order and the various parts may be readily adjusted for performing the various necessary operations to complete the washing and draining of a batch of clothes.

I claim as my invention:

1. A washing machine comprising a tub adapted to turn about a vertical axis and to receive the washing fluid and the articles to be washed and provided with a central hollow post projecting upwardly from the bottom of the tub, an upright shaft the upper end of which receives said hollow post, and means for coupling and uncoupling said shaft and tub consisting of a collar arranged on the shaft and a hub arranged on said bottom, said collar and hub being provided with coupling surfaces which are adapted to be interlocked upon lowering the tub on said shaft and to be unlocked upon raising said tub relatively to said shaft.

2. A washing machine comprising a tub adapted to turn about a vertical axis, an upright shaft on which said tub is mounted to turn therewith, and means for turning said shaft comprising a gear wheel mounted on said shaft, a rock lever provided with a gear segment meshing with said gear wheel, and provided on its free end with a longitudinal guide-way, a rotary crank arm having a wrist pin working in said guide-way, a worm-wheel connected with said crank arm, a worm meshing with said worm wheel, and a driving shaft carrying said worm.

3. A washing machine comprising a tub adapted to receive the washing liquid and the articles to be washed, a main driving shaft, and means for transmitting either a rapid rotary motion or a slow rocking motion to said tub from said shaft comprising an upright driven shaft upon which said tub is mounted, a driven bevel gear wheel mounted loosely on said driven shaft, a driving bevel gear wheel mounted on the driving shaft and meshing with said driven bevel gear wheel, a rock lever provided with a gear segment and with a longitudinal guide-way, a longitudinally movable spur gear wheel splined on the driven shaft and movable into and out of engagement from said gear segment, and means for coupling said spur gear wheel with said driven bevel gear wheel.

4. A washing machine comprising a tub adapted to receive the washing liquid and the articles to be washed, a main driving shaft, and means for transmitting either a rapid rotary motion or a slow rocking motion to said tub from said shaft comprising an upright driven shaft upon which said tub is mounted, a driven bevel gear wheel mounted loosely on said driven shaft, a driving bevel gear wheel mounted on the driving shaft and meshing with said driven bevel gear wheel, a rock lever provided with a gear segment and with a longitudinal guide-way, a longitudinally movable spur gear wheel splined on the driven shaft and movable into and out of engagement from said gear segment, means for coupling said spur gear wheel with said driven bevel gear wheel comprising a hub carrying said spur wheel and provided with a coupling face adapted to engage with a corresponding locking face on the hub of said driven bevel gear wheel.

5. A washing machine having a vat, a tub supported therein for rotatable oscillation or continuous rotation, driving mechanism connected with the tub to rotatably oscillate or continuously rotate the tub, said tub being provided with an overhanging rim flange and discharge apertures disposed only in proximity thereto through which the fluid contents of the tub will be exhausted during continuous rotation.

6. A washing machine having a vat, a tub removably rotatably supported within the vat and spaced from the wall thereof and provided with an overhanging rim flange, said tub being provided in proximity to said flange with discharge apertures, said tub being otherwise imperforate, said vat being provided with a removable rim flange overhanging the tub and the space between the tub and the vat, and a cover removably seated upon the rim flange of the vat.

PHILIP H. WALLER.